April 30, 1963  E. W. A. BECKER  3,087,791
PROCESS FOR THE PRODUCTION OF WATER OR HYDROGEN
HAVING AN INCREASED DEUTERIUM CONTENT
Filed Sept. 1, 1955
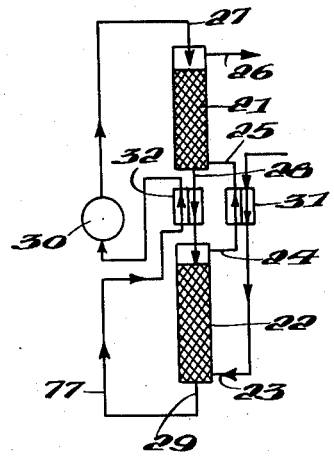
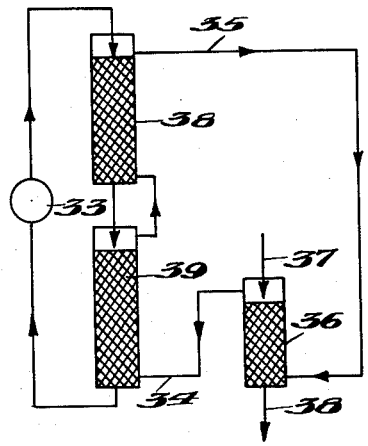
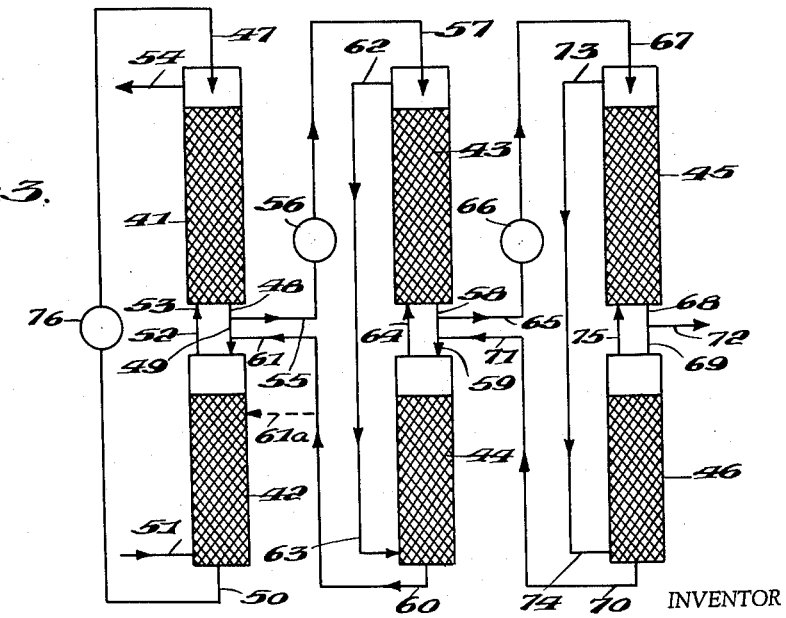
INVENTOR
ERWIN WILLY ALBERT BECKER
BY *Bailey, Stephens & Huettig*
ATTORNEYS

United States Patent Office 3,087,791
Patented Apr. 30, 1963

3,087,791
PROCESS FOR THE PRODUCTION OF WATER OR HYDROGEN HAVING AN INCREASED DEUTERIUM CONTENT
Erwin Willy Albert Becker, 5 Renthof, Marburg, Germany
Filed Sept. 1, 1955, Ser. No. 531,980
Claims priority, application Germany Sept. 8, 1954
6 Claims. (Cl. 23—204)

The present invention relates to a process for the production of water or hydrogen having an increased deuterium content employing the deuterium exchange reactions between hydrogen and water in the presence of a catalyst.

Various processes for the production of deuterium, for example electrolytic methods and distillation processes employing water or hydrogen as starting substance, are already known. The equilibrium of the exchange reaction between hydrogen and water has already been used for a technical method of production. In this method, hydrogen and liquid water are passed in counter-current through a column having a bubble plate, at the lower end of which column the water is converted into hydrogen by electrolysis. A partial establishment of the exchange equilibrium is thus brought about in the gas phase between the bubble plates by passing the mixture of hydrogen and steam through catalyst beds. By reason of the extremely large amount of electrical energy required for the phase reversal by electrolysis, economic application of the process is possible only in cases where a considerable proportion of the operating costs can be covered by chemically working up the hydrogen of low deuterium content which is produced. However, this is possible only in rare cases, since chemically produced hydrogen is substantially cheaper and is sufficiently pure for most chemical processes. In addition, owing to the large liquid content of the electrolytic cells, the starting-up period of the separating plant lasts many months, which is also a serious technical and economic disadvantage of the known process. The replacement of electrolysis by a chemical reduction of water also generally proves unsatisfactory in most cases.

In another known exchange process, the so-called hot-cold process, the known disadvantages of phase reversal at the lower end of the column are avoided by bringing circulated hydrogen into contact with steam, which is also circulated, first at high temperature and thereafter at low temperature in the presence of a catalyst. Exchange equilibrium is thus substantially established, both at the high working temperature and at the low working temperature. However, the increase in the deuterium content is dependent upon the number of circuits and consequently upon the number of evaporations and condensations. Such plants can be operated with technical value only if a large number of water and hydrogen circuits are connected in series with corresponding condensers and evaporators. Apart from the fact that the cost of the equipment is extremely high, a great amount of energy is required for the repeated evaporation and recondensation of the circulating quantities of water in carrying out this process, even when heat exchangers are employed.

It has also been proposed to carry out the catalysis of the isotope exchange between hydrogen and water in the liquid phase by passing hydrogen and liquid water in counter-current or in the same direction through columns containing a catalytically active packing. In this case, a phase reversal is again effected at one end of the column by electrolysis or chemical reduction of the water. In order to ensure that the catalyst remains fixed in position and that there is a sufficient throughflow of gas and liquid, the catalyst must be introduced into the columns in the form of relatively large pieces or compressed bodies, which give a relatively low specific catalyst activity. This fact, combined with the large quantities of energy necessary for the phase reversal, necessitates such a high technical and economic expenditure that the process is hardly practicable.

In the process according to the invention, the disadvantageous and difficult phase reversal between the hydrogen and the water is avoided by virtue of the fact that a second column operating at high temperature with liquid water and gaseous hydrogen in counter-current is connected to the lower end of a concentration column.

Thus, in the process according to the invention, only the cold column operates as a concentration column, while the hot column serves to bring the deuterium content of the hydrogen into equilibrium with the deuterium content of the water discharge from the bottom of the cold column, while in accordance with the invention both columns operate under elevated pressure. The exchange reaction in the lower column is with advantage carried out at a temperature above 150° C., preferably at about 200° C. The upper column is accordingly maintained at a lower temperature, for example below 100° C. and preferably at a temperature between 20° C. and 50° C. If the process according to the invention is carried out in two columns, of which the lower is maintained at 200° C. and the upper at 20° C., the elementary effect is calculated from the difference between the equilibrium constants for the exchange reactions in the cold and hot columns. The equilibrium constant of the reaction $$HD + H_2O \rightleftharpoons H_2 + HDO$$

amounts to 2.0 at 200° C., and to 3.8 at 20° C., so that an elementary effect of 1.8 is obtained in the example chosen. It will thus be seen that the yield of such an installation is comparatively favourable and the necessary throughput is therefore maintained within practically tolerable limits.

As already mentioned, in the process according to the invention, the exchange reaction in the two columns is carried out under elevated pressure, which should amount to at least 10 atmospheres gauge. Preferably, the process is carried out at pressures of about 100 atmospheres gauge. Further advantages are thus obtained in that, owing to the increase in the solubility of the hydrogen in the liquid water, the diffusion of the gas to the surface of the catalyst through the liquid film is promoted. On the other hand, the solubility of the hydrogen is not so great that a reduction of the effective elementary effect must be accepted. The partial water vapour pressure remains within tolerable limits even in the hot column owing to the high pressures employed in the process according to the invention.

As already mentioned, the exchange of deuterium between water and hydrogen is effected with the aid of a catalyst which may be fixedly disposed in the columns. However, an essential advantage of the process resides in the fact that a circulating catalyst can be employed, if the catalytically active substance is passed through the two columns in counter-current to the hydrogen in aqueous dispersion or colloidal solution in a closed circuit. In this preferred method of carrying out the process according to the invention, it is found that it is surprisingly possible to overcome at the same time the disadvantages caused by the coarse distribution of the catalyst and by phase reversal, since it was not to be expected that the catalyst dispersions or sols employed in accordance with the invention would be sufficiently resistant to temperature to withstand continuous operation in the hot columns at temperatures of 200° C. without any reduction in their catalytic activity and without being impaired by flocculation or agglomeration. In the practical performance of the preferred method of operation, the catalyst is therefore circulated in highly dispersed form together with the liquid phase through two series-connected columns maintained at different temperatures, while a current of normal hydrogen flows successively through the two columns. With such a method of operation, the columns naturally only need to be charged with inactive packing elements or to be provided with appropriate internal fittings, for example bubble plates, which are capable of bringing about an intimate contact between the gas and the liquid.

An example of this method is illustrated in FIGURE 1 of the annexed drawings, in which 21 is the upper cold column and 22 the lower hot column. Hydrogen having a normal deuterium content enters at 23, leaves the column 22 at 24 and passes through 25 into the cold column, from which it is withdrawn with reduced deuterium content at 26. The catalyst sol is fed to the column 21 in countercurrent at 27, as mentioned, flows therethrough from the top downwards and passes through 28 into the column 22, at the bottom of which it is discharged at 29. The pump 30 and the associated return pipe ensure constant circulation of the catalyst sol through the two columns in countercurrent to the hydrogen. A part of the heat carried by the currents of gas and liquid may be exchanged by means of heat exchangers 31 and 32. A further part is automatically exchanged within the column by the countercurrent flow of the cold catalyst liquid coming from the top and the hot gas coming from the bottom.

Hydrogen of increased deuterium content can be withdrawn at 24 or 25, or else water of high deuterium content can be obtained by continuously withdrawing predetermined proportions from the catalyst circuit at 28 and freeing the withdrawn liquid from the catalyst, in which case it is necessary to feed corresponding further quantities of catalyst sol to the circuit. However, it is considerably more advantageous to remove a corresponding quantity of the liquid water from the catalyst sol by distillation from the top of the column 22, with the aid of the high temperatures obtaining at this point. If heat exchangers are employed, the liquid water may be withdrawn from the water of condensation formed at 24 in the heat exchanger 31.

A very advantageous modification of the embodiment described in the foregoing is obtained when water is employed as the starting material, so that here again the hydrogen and the catalyst sol can be moved in the closed circuit.

For this purpose, it is merely necessary to incorporate in the hydrogen circuit an auxiliary column which is charged with active packing elements and which only needs to have the activity of a few theoretical plates. Water having a normal deuterium content is passed through this column from the top downwards, that is to say, in countercurrent to the circulating hydrogen, the deuterium content of which is continuously regenerated at elevated temperatures.

Such a modification of the process according to the invention will be more particularly described by way of example with reference to FIGURE 2, in which 38 and 39 designate the cold and hot columns through which, as in FIGURE 1, catalyst sol circulates through the pump 33 with its associated return pipe. The hydrogen enters the hot column 39 at 34 and then returns into the circuit at 35 by way of the top of the cold column, in the manner already described. It then flows through the auxiliary column 36, which is at a high temperature, for example 200° C., and is charged with active packing elements. Water having a normal deuterium content is fed to the column at 37 and, after regenerating deuterium in the hydrogen, is withdrawn at 38 as an impoverished product. The enriched hydrogen or enriched liquid is withdrawn as in the embodiment according to FIGURE 1. A heat exchange preferably in like phases, may also be effected between the columns in the embodiment diagrammatically illustrated in FIGURE 2.

The process according to the invention in the form illustrated in FIGURE 2 is particularly suitable for the treatment of water having a higher than normal deuterium content, for example water derived from technical processes in which a slight increase in isotope content takes place. For this purpose, in the arrangement illustrated in FIGURE 2, the water to be treated, instead of the water of normal content, would be fed through the column 36 in a closed or open circuit. It is also possible by this method to treat large quantities of water having a low deuterium content in an economically and technically satisfactory manner.

For obtaining higher degrees of concentration, it may be expedient, in order to reduce the total volume of the apparatus, the starting-up period and the quantity of catalyst, to carry out the process according to the invention in all its forms in a number of series-connected stages each consisting of a hot column and a cold column, the throughput of which decreases progressively in accordance with the degree of concentration effected in each instance.

The application of this method of operation to the embodiment of the invention illustrated in FIGURE 1 is illustrated by way of example in FIGURE 3 for three stages.

The figure shows three pairs of columns, each consisting of two columns 41/42, 43/44 and 45/46. Catalyst liquid is fed to the head of the first column 41 at 47, the said liquid leaving the bottom of the column at 48 and entering the top of the column 42 at 49. The liquid leaves the column 42 at 50 and is returned to the top of the column 41 through the pump 76. The hydrogen enters the column 42 at 51 and flows through 52 and 53 into the column 41, which it leaves at 54 with a reduced deuterium content. A part of the catalyst liquid which has passed from the column 41 into the column 42 is withdrawn at 55 and is fed through the pump 56 to the cold column 43 of the second pair at 57. This part of the catalyst liquid leaves the column 43 at 58 and enters the top of the column 44 at 59, from which column it is discharged at 60 and returned to the top of the column 42 at 61. The return may alternatively take place at a lower point of the column 42, for example at 61a at which the mixing streams of liquid have substantially identical isotope composition. The hydrogen is circulated through the columns 43 and 44 by way of 62, 63 and 64, at which the hydrogen leaves the column 44 and enters the column 43. At the top of the column 44, a part of the quantity of catalyst liquid is again withdrawn at 65 and is fed through the pump 66 to the top of the column 45 at 67. This part of the liquid leaves the bottom of the column at 68 and passes to the top of the column 46 at 69, from which column it is discharged at 70 and fed back to the column 44 at 71. The enriched water is withdrawn between the columns 45 and 46 at 72. In order to circulate hydrogen through the columns 45 and 46, hydrogen is withdrawn from the top of the column 45 at 73 and re-introduced into the bottom of the column 46 at 74. The hydrogen is returned from the column 46 into the column 45 by way of the connection 75.

The coupling of the stages may be effected through the gaseous phase instead of through the liquid phase as hereinbefore described. The stages may also be connected through the water of condensation forming in the heat exchanger 31 (FIGURE 1).

Further advantages may also be obtained in carrying out the process according to the invention by adding to the liquid phase surface-active substances which favourably influence the exchange conditions between the phases in the columns. In addition, substances which regulate, and preferably reduce, the pH value may also be added to the liquid phase, which has proved satisfactory especially when catalysts of the Pt-group are employed.

A particular advantage is afforded by the process according to the invention when carried out in the preferred form with a circulating catalyst by reason of the fact that it is possible to regenerate the catalyst during operation. While complete interruption of the operation and possibly emptying of the columns is necessary to remove any concentration of catalyst poisons formed when a fixed catalyst is employed, the following possible methods of regenerating the catalyst during operation have proved satisfactory in carrying out the process according to the invention with a circulating catalyst.

(a) When catalyst sols or very finely divided suspensions are employed, it is generally sufficient to introduce into the catalyst circuit at any desired point, for example at the point designated by 77 in FIGURE 1, cartridges containing ion exchangers or other substances combining the poisons. When exhausted, the cartridges may be extracted by way of by-pass ducts and replaced during operation. For increasing the stability of the state of the sol, it has proved expedient to subject the sol to ultrasonic treatment during operation. An appropriate device may also be provided at any desired point of the sol circuit, for example at the point designated by 77 in FIGURE 1.

(b) When coarser dispersions are employed, and for removing poisons which cannot be completely combined by means of ion exchangers or other substances introduced into the circuit, a small part of the catalyst suspension may be repeatedly withdrawn during operation and replaced by regenerated catalyst.

Platinum, palladium or other metals of the platinum group, as well as nickel either singly or in combination, are particularly suitable for use as catalysts. In the preferred embodiment employing a circulating catalyst, they are employed in the form of sols, if desired stabilised, or in the form of suspensions in which the catalyst metal may be precipitated on a high dispersed carrier.

If the catalyst is fixed in the columns, it may be provided as a surface coating on packing elements consisting of other metals, such as nickel, or of ceramic materials. Packing elements which themselves consist of a catalytically active metal may also be employed. It is also possible to dispose the catalyst in the form of a network in the column or to line the surface of the column with catalytically active coatings.

The process according to the invention will be more fully described in the following with reference to examples.

*Example 1*

An arrangement according to FIGURE 1 was employed. The column 22 consisted of a V 2 A steel tube having an internal diameter of 14 mm. and a length of 1.8 m., while the column 21 consisted of a similar tube 9 m. in length. The column 21 was maintained at 70° C. and the column 22 at 140° C. The columns were packed with glass coils 5 mm. in diameter. The pump 30 circulated 200 cc. per hour of a platinum sol having a platinum content of about 1% through the columns (catalyst 1, Table 1). 0.5 normal cu. m. of hydrogen entered the column 22 per hour at 23 and left the column 21 at 26. The hydrogen in the columns was under the pressure of 80 atmospheres gauge.

After a starting-up time of 40 minutes, the hydrogen withdrawn at 24 had an HD-content higher than that of the starting hydrogen by the factor 1.36.

*Example 2*

The activities of different catalysts present in sol form or in the form of a highly dispersed suspension of the present catalysts were compared as follows: 0.5 cc. of the catalyst liquid on glass wool was introduced into a glass pipette having a capacity of 20 cc. After brief exhausting 200 mm. Hg of pure deuterium gas were introduced. Samples of gas were extracted from the pipette at brief intervals of time, and the deuterium content thereof was tested in a mass spectrometer. The values given in Table 1 were obtained, for example, at room temperature for the half-period of the deuterium exchange.

| Number of the Catalyst | Nature of the Catalyst | Half-Period (seconds) |
|---|---|---|
| 1 | Platinum sol about 1% of platinum | 80 |
| 2 | Platinum sol about 3% of Pt | 20 |
| 3 | 20 g. of activated carbon powder containing 10% of Pt. to 140 g. of water. | 10 |

If catalyst 3 is employed instead of catalyst 1, the arrangement described in Example 1 would give a concentration factor of 7.9. If the temperature of the hot column is increased to 200° C., which is readily possible with catalyst 3, the concentration factor to be expected is further increased to about 50.

*Example 3*

The detoxification of the catalyst by ion exchangers is illustrated by the following experiment: 3 cc. of an 0.6% platinum sol having a half-period of 100 sec., were mixed with 0.1 cc. of an 0.035 molar copper sulphate solution. The half-period of the deuterium exchange (see Example 2) thus rose to 380 sec. After brief shaking of the sol with a mixture of 0.5 g. of anion exchanger and 0.5 g. of cation exchanger, a half-period of 85 sec. was obtained, which corresponds to the initial value within the limit of error. The sol had thus been completely detoxified.

What I claim is:

1. In a method for increasing the deuterium content in a deuterium containing substance selected from the group consisting of molecular hydrogen and water comprising passing streams of molecular hydrogen and liquid water under superatmospheric pressure countercurrent to each other serially through a hot and a cold column in the presence of a catalyst selected from the group consisting of the platinum group metals and nickel, the liquid water first passing through the cold column and then passing through the hot column and the molecular hydrogen first passing through the hot column and then passing through the cold column and withdrawing a deuterium containing substance selected from the group consisting of molecular hydrogen and water enriched in deuterium from one of the streams at a point between the two columns, the step which comprises passing said catalyst through the two columns in a closed circuit in the form of a dispersion in said water flowing through the columns.

2. The method of claim 1 in which said hydrogen leaving the cold column is recycled to the hot column, and said hydrogen in its circuit from the cold colum to the hot column is passed through an auxiliary column charged with catalytically active packing elements promoting deuterium exchange containing a catalyst selected from the group consisting of the platinum group metals and nickel while water at a temperature between about 150° and 200° C. is simultaneously passed through such column countercurrent to such hydrogen.

3. The method of claim 1 in which said water contains a wetting agent.

4. The method of claim 1 comprising in addition treating said catalyst dispersion in the closed circuit to remove catalyst poisons.

5. The method of claim 1 in which said cold column is maintained at a temperature between about 20 and 100° C. and said hot column is maintained at a temperature between about 150° and 200° C.

6. The method of claim 1 in which a pressure of between about 10 and 100 atmospheres gauge pressure is maintained in such hot and cold columns.

References Cited in the file of this patent

UNITED STATES PATENTS

| | | |
|---|---|---|
| 1,217,118 | Ellis | Feb. 20, 1917 |
| 1,843,862 | Buc | Feb. 2, 1932 |
| 2,134,249 | Hansgirg | Oct. 25, 1938 |
| 2,156,851 | Hansgirg | May 2, 1939 |
| 2,690,379 | Urey et al. | Sept. 28, 1954 |
| 2,741,543 | Urey | Apr. 10, 1956 |
| 2,776,263 | Hiskey et al. | Jan. 1, 1957 |
| 2,787,526 | Spevack | Apr. 2, 1957 |

FOREIGN PATENTS

| | | |
|---|---|---|
| 489,610 | Great Britain | July 25, 1938 |

OTHER REFERENCES

Berkman et al.: "Catalysis," publ. by Reinhold Publ. Corp., New York, 1940, pages 247 to 253 inclusive.

Babor et al.: "General College Chemistry," 1940, pages 438, 443.